(12) United States Patent
Kindaichi et al.

(10) Patent No.: US 6,647,205 B1
(45) Date of Patent: Nov. 11, 2003

(54) DISTANCE-MEASURING SENSOR, DISTANCE-MEASURING DEVICE AND CAMERA AS WELL AS DISTANCE-MEASURING METHOD

(75) Inventors: Takeshi Kindaichi, Hachiouji (JP); Koichi Nakata, Kokubunji (JP); Osamu Nonaka, Sagamihara (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 10/265,951

(22) Filed: Oct. 7, 2002

(30) Foreign Application Priority Data

Oct. 10, 2001 (JP) ........................................ 2001-312961

(51) Int. Cl.[7] ............................................... G03B 13/00
(52) U.S. Cl. ..................................................... 396/121
(58) Field of Search ................................. 396/125, 126, 396/127, 128, 89, 121, 122, 123, 124; 356/3.13–3.16, 4.01; 348/294

(56) References Cited

U.S. PATENT DOCUMENTS

| | | | | |
|---|---|---|---|---|
| 5,469,239 A | * | 11/1995 | Ishida et al. | ............. 396/125 X |
| 5,608,513 A | * | 3/1997 | Komatsu et al. | ................ 356/3 |
| 5,883,830 A | * | 3/1999 | Hirt et al. | ............... 348/294 X |
| 6,549,235 B1 | * | 4/2003 | Fossum et al. | ............. 348/294 |
| 2002/0140834 A1 | * | 10/2002 | Olding et al. | ................ 348/294 |

* cited by examiner

*Primary Examiner*—W. B. Perkey
(74) *Attorney, Agent, or Firm*—Straub & Pokotylo; John C. Pokotylo

(57) ABSTRACT

To provide a distance-measuring sensor which does not impair the universality, suppresses the requirement of a large memory capacity for storage and an increase of data transmission time, a new distance-measuring sensor is provided. The sensor has an arithmetic part for calculating the intermediate data of a distance calculation, and an output part for outputting the intermediate data.

22 Claims, 3 Drawing Sheets

DISTANCE-MEASURING SENSOR, DISTANCE-MEASURING DEVICE AND CAMERA AS WELL AS DISTANCE-MEASURING METHOD

CROSS-REFERENCE TO RELATED APPLICATION

This application is based upon and claims the benefit of priority from the prior Japanese Patent Application No. 2001-312961, filed Oct. 10, 2001, and the entire contents of the application are incorporated herein by reference.

BACKGROUND OF THE INVENTION

1. Field of the Invention

The present invention relates to a distance-measuring sensor. In more detail, the present invention relates to a distance-measuring sensor of a distance-measuring device which is used in a camera, etc. and utilizes a phase difference mode in the trigonometric survey. In addition, the present invention relates to the above distance-measuring device or camera using the above distance-measuring sensor.

2. Description of the Related Art

Recent sensors used in distance-measuring devices are benefited by the rapid progress of semiconductor manufacturing techniques and circuit design techniques. Microfining and area formation (a migration from a line sensor to an area sensor) are advancing, and the number of photoelectric conversion elements used in distance measurements tends to increase. Distance-measuring devices measure the distances of multiple places of an object (multipoint distance measurement). Therefore, it becomes possible to analyze a field all over to detect an object by increasing the number of distance measurement places. Accordingly, a camera user need not be concerned with focusing for a photograph and can devote their attention to composition. Of course, the probability of taking a fuzzy photograph also decreases.

Thus, an increase in the number of image elements of photoelectric conversion elements makes a contribution to the high performance of a distance-measuring device. On the other hand, output data for each image element (written as an object image signal hereafter) are memorized and stored into an external memory outside a sensor, and the distance to an object is commonly calculated by an arithmetic part outside the sensor using the data stored in this external memory. Therefore, the increase in the number of image elements of the photoelectric conversion elements causes such new requirements such as a large, memory capacity of external memory and an increase of transmission time for transmitting the object image signal to the external memory.

A technique in which all distance-measuring calculations made by a distance-measuring device are performed in a distance-measuring sensor, has been known to resolve these new requirements. In this distance-measuring device, only the final data are output and stored in an external memory, while the distance-measuring calculations are made inside the distance-measuring sensor. Therefore, it enables one to save the external memory capacity and shorten the transmission time of data output.

However, in the above distance-measuring device, such problems as the large memory capacity for storage and the increase of data transmission time, being the mentioned side effects of the high image element of the photoelectric conversion elements can be solved. A new problem of reducing the universality of the distance-measuring sensor arises, because all the processing has to be executed in the distance-measuring sensor.

In distance measurement, the universality is important for giving the processing the characteristics that correspond to an object to improve the distance measurement accuracy. For example, the distance measurement of a phase difference mode holds such a principled problem that the distance measurement accuracy of a low-contrast object is bad due to the properties of a phase difference calculation. Accordingly, when the distance measurement of a low-contrast object is made by the phase difference mode, a measure for giving a differential processing to an object image signal (e.g., obtaining a difference of an adjacent object image signal) and then performing a phase difference calculation has been conceived.

Namely, it is possible to improve the distance measurement accuracy by giving the processing in response to an object to an object image signal. However, in a distance-measuring sensor of such a simplified construction (a low universality) that only a phase difference calculation for a common object is performed, a differential processing for such a hard-to-handle object cannot be performed. Thus an improvement of the distance measurement accuracy cannot be achieved. Conversely, if all the processing including this processing is executed in a distance-measuring sensor, the circuits in the distance-measuring sensor are complicated and an increase in the cost of the distance-measuring sensor is induced.

The present invention was made in view of the above circumstances. The present invention is aimed at providing a distance-measuring sensor which does not impair the universality, suppresses the requirement of a large memory capacity for storage and an increase of data transmission time and is usable in the construction of a distance-measuring system.

BRIEF SUMMARY OF THE INVENTION

To achieve the above purpose, the distance-measuring sensor based on the present invention has a light-receiving part with multiple photoelectric conversion elements for converting a light from a distant measured object to an electric signal corresponding to the intensity of the light, an arithmetic part for calculating the intermediate data of a distance calculation based on.the electric signal output by the above light-receiving part, and an output part for outputting the intermediate data calculated by the distance calculation. In this distance-measuring sensor, the arithmetic is performed in the above distance-measuring sensor until the intermediate data of the distance calculation, and the intermediate data are output. For example, the CPU receives the intermediate data and executes a residual distance calculation externally. Thus, the data quantity output is small as compared to a case where all of the data are output without applying an arithmetic calculation to the photoelectric conversion data, because the arithmetic is performed until the intermediate data of distance calculation in the distance-measuring sensor of the present invention. Moreover, the capacity of the external memory is also small. Furthermore, the universality is also impaired little because of the output at the intermediate data stage.

The above intermediate data calculated in the arithmetic part of this distance-measuring sensor are preferably values calculated one by one by repeated calculations. In such a way, the distance-measuring sensor may output only one intermediate data rather than a large quantity of data groups for arithmetic calculation. Therefore, the time for transmitting the output data is greatly reduced. Moreover, a function for changing the data and repeating the same arithmetic and a function for judging the conditions to get rid of the repetition are necessary, thus a complicated circuit construction is needed. Therefore, the complication of the distance-measuring sensor can be avoided by not performing all the repeated calculations with the distance-measuring sensor.

This distance-measuring sensor is preferably used in the distance measurement by the phase difference detection method. This distance-measuring sensor is located such that a divided light beam from an object irradiates different portions of the light-receiving part (the portions do not overlap). This distance-measuring sensor also has a region-assigning part for assigning regions in respective portions irradiated by the divided light beam on the light-receiving part. The arithmetic part performs the arithmetic for comparing photoelectric signals generated in the regions.designated by this region-assigning part (more specifically, data based on generated photoelectric signals) with each other, and the results (correlated values) are obtained as intermediate data of distance measurement. The region assignment given by the region-assigning part are repeatedly performed by changing positions one by one, the arithmetic part calculates the intermediate data for every region assignment and outputs the intermediate data from the output part externally (e.g., CPU). Thus, repeated calculations for obtaining the correlated values between the regions are performed by a phase difference detection method, but this distance-measuring sensor obtains the correlated values calculated one by one by the repeated calculations as the intermediate data and outputs the data externally. Therefore, this distance-measuring sensor does not need a complicated circuit construction and restrains the transmission time of the output data.

The region-assigning part of this distance-measuring sensor preferably assigns the regions by external assignment. It enables one to flexibly change the selection methods of the regions according to an object. For example, a selection of arithmetic processing corresponding to the contrast of a distance measured object is enabled in a distance calculation by the phase difference detection method. More specifically, an effective region (non-shielded region) and a light shielded region (a region shielded so that a light does not irradiate) are provided in the light-receiving part. If a distance measured object has a common contrast, the regions are selected from the effective region and the light shielded region and a difference between the output of effective region and the output of light shielded region is obtained to cancel noises due to a dark current. On the other hand, if the contrast of a distance measured object is low, two adjacent or partly overlapped regions are selected in the effective region, and a difference of the outputs of adjacent photoelectric conversion elements is calculated to differentiate (difference) the outputs.

BRIEF DESCRIPTION OF THE DRAWINGS

These and other features, aspects and advantages of the device and method of the present invention will become better understood with regard to the following description, appended claims and accompanying drawings where:

DETAILED DESCRIPTION OF THE INVENTION

Preferred embodiments of the present invention will be described hereinafter with reference to the drawings.

Figure 1:
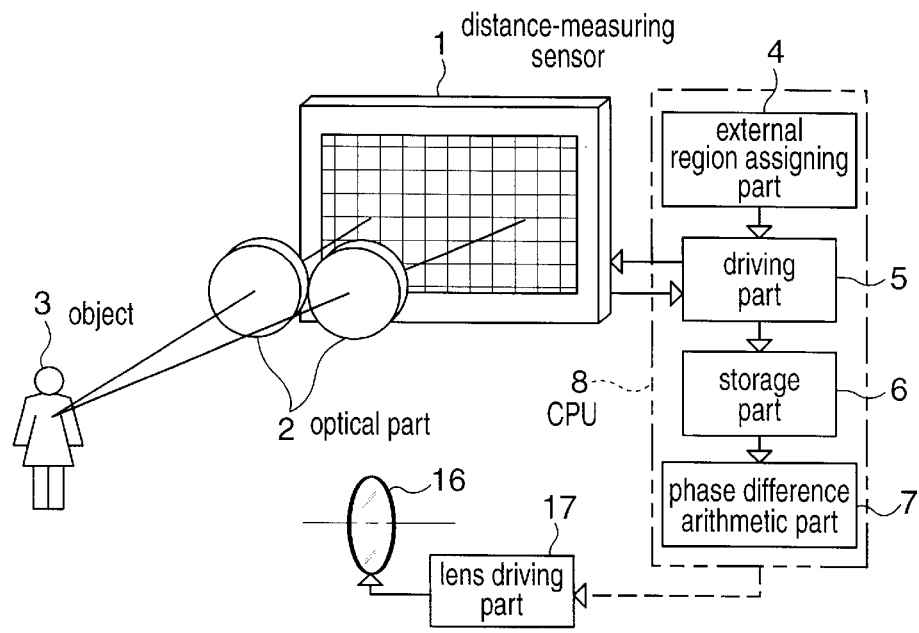
FIG. 1 is a block diagram in the distance-measuring device of a camera using a distance-measuring sensor relating to one embodiment of the present invention.

The distance-measuring sensor of the present invention will be illustrated as embodiments of the present invention by examples hereinafter. FIG. 1 is a diagram mainly showing the construction of a distance-measuring device in a camera using a distance-measuring sensor relating to one embodiment of the present invention.

In this embodiment, the distance to an object is obtained by a phase difference detection method which is a widely known technique in a distance-measuring device of camera. The phase difference detection method is a method wherein a light beam from an object is divided into two parts and projected on a light-receiving plane to obtain a distance to the object from a distance between two projected images by trigonometric method. Accordingly, it is necessary to detect a projected image given by one light beam and a projected image given by the other beam to obtain the distance between the images. This arithmetic is called a phase difference calculation. The phase difference calculation will be described later with reference to FIG. 4.

The distance-measuring device using a distance-measuring sensor relating to this embodiment has a distance-measuring sensor 1, an optical part 2 and a CPU 8.

A focusing optical system 16 for making focus adjustments which is a part of a photographic lens of the camera and a lens driving part 17 for driving this focusing optical system 16 in the direction of optical axis of the photographic lens exist outside of this distance-measuring device. The lens driving part 17 may have a construction directly controlled by the CPU 8 or may have a construction controlled via a main CPU (non-illustrated) for controlling the actions of the entire camera.

The distance-measuring sensor 1 converts a light from an object lighted via the optical part 2 to an electric signal, integrates the electric signal, calculates the intermediate data which is a midway result of a phase difference calculation for performing a distance calculation using the integration result and outputs the data to the CPU 8. In FIG. 1, the light-receiving plane of the distance-measuring sensor 1 is depicted by one plane, but it may also be one pair of light-receiving planes corresponding to left and right lenses of the optical part 2.

The optical part 2 is one pair of optical elements for leading the light from the object 3 to the distance-measuring sensor 1. It is necessary to not overlap the beams passing through each of the pair of the optical part 2 on the light-receiving plane of the distance-measuring sensor 1. Therefore, it is desirable to make a construction such that the optical paths passing through each of the pair of the optical part 2 are independent and mutually light shielded.

The CPU 8 is a part for executing the distance measurement of the object 3 based on the output result (intermediate data) of the distance-measuring sensor 1.

An external region-assigning part 4 is a part for assigning regions used for the distance calculation in a light-receiving part 9 (described later with reference to FIG. 2) inside the distance-measuring sensor 1.

A driving part 5 is an interface part with the driving of the distance-measuring sensor 1 as main function.

A storage part 6 is a part for memorizing and storing the output data from the distance-measuring sensor 1 external to the distance-measuring sensor 1. Moreover, these output data are not initial data such as object image signal, etc. but intermediate data which are a midway result of a phase difference calculation operated inside the distance-measuring sensor 1.

A phase difference arithmetic part 7 executes residual calculations based on the multiple intermediate data memorized and stored in the storage part 6 to complete the phase difference calculation. Moreover, the calculation is unnecessary to stop at the phase difference calculation, it may be advanced to the object distance or executed to data equivalent to the driving amount of the focusing optical system 16 of the camera.

The focusing optical system 16 is driven by the lens driving part 17 based on data equivalent to the driving amount of the focusing optical system 16 which is finally calculated by the CPU 8 or the main CPU. The image pick-up of the camera is made by the image pick-up elements 18 (e.g., CCD).

Figure 2:
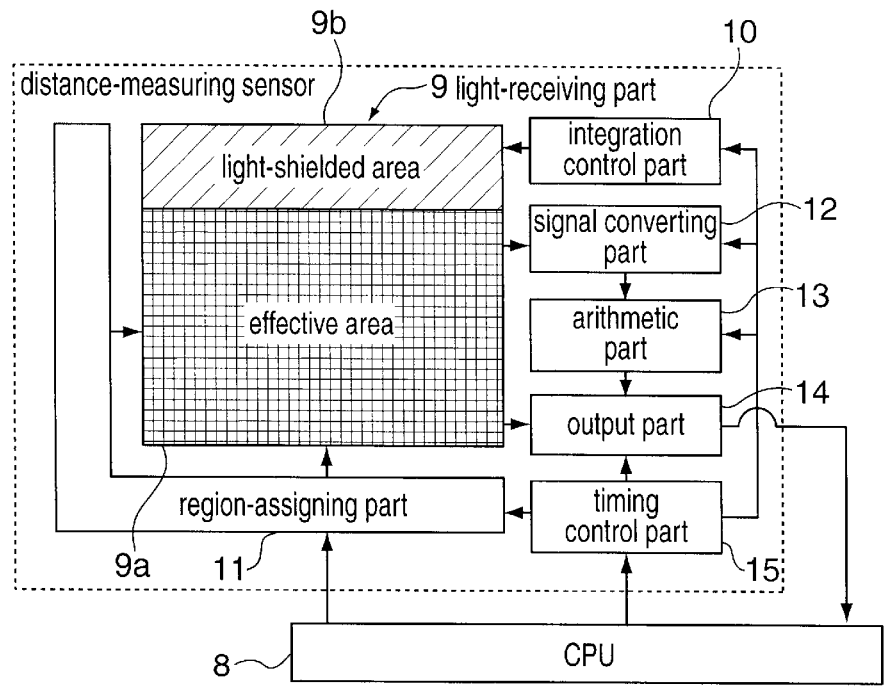
FIG. 2 is a block diagram showing the internal construction of a distance-measuring sensor relating to one embodiment of the present invention.

Next, the internal construction of the distance-measuring sensor 1 relating to this embodiment is illustrated by FIG. 2.

The distance-measuring sensor 1 has a light-receiving part 9, an integration control part 10, a region-assigning part 11, a signal converting part 12, an arithmetic part 13, an output part 14, and a timing control part 15.

The light-receiving part 9 is a part for receiving an image of the object 3 and is constructed by a portion of the effective region 9a and a portion of the light shielded region 9b. Moreover, a CMOS imager is used in the light-receiving part 9 of the distance-measuring sensor 1 in this embodiment. Therefore, respective image elements of the light-receiving part 9 function as a light-receiving part for receiving an image of the object 3 and function as an integrating part for integrating a photoelectrically converted charge. This uses the junction capacitance of each image element as a condenser for using in the integration. A photocurrent generated by each image element of the light-receiving part is converted to a voltage for each image element. Of course, the light-receiving part 9 may also be constructed by dividing it into the light-receiving part and integrating part.

The integration control part 10 is a part for managing the integration reset, integration start and integration end given by the light-receiving part 9.

The region-assigning part 11 is a part for assigning regions constructed by multiple image elements on the light-receiving plane of the light-receiving part 9. Then, an integration voltage being an integration result of the light-receiving part 9 is output from those assigned regions to the signal converting part 12. Moreover, the region-assigning part 11 can also assign individual image elements in the assigned regions, therefore they can also be so assigned as to output the integration result given by a single integrating part (one image element of the light-receiving part 9) when the integration result of the light-receiving part 9 is output.

The signal converting part 12 is a part for analog-to-digital conversion of the integration voltage output from the light-receiving part 9 converts an analog integration voltage in the regions assigned by the region-assigning part 11 to a digital signal and outputs it to the arithmetic part 13.

The arithmetic part 13 is an arithmetic circuit which is so constructed as to execute a calculation of the following Eq. 1 based on signal data input from the signal converting part 12.

$$F = \sum_{i=0}^{n} |(L_i - l_i) - (R_i - r_i)| \qquad \text{(Eq. 1)}$$

Here, F is the arithmetic output and is the intermediate data of the phase difference calculation output by the distance-measuring sensor 1. This F is generally called the correlated values, etc. $L_i$, $l_i$, $R_i$, $r_i$ are image element data of each image element, and are digital data given by analog-to-digital conversion of the integration voltage of each image element with the signal converting part 12. "i" is an element showing the order of an image element array. $L_i$, $l_i$ are taken as image element data of optically paired image elements at the left light-receiving plane of the light-receiving part 9, and $R_i$, $r_i$ are taken as image element data at the right light-receiving plane. The region assignment of the image element data is made by assigning a front address (i=0) and a number (n). Details will be described later based on FIG. 4A and FIG. 4B.

The output part 14 is a part for outputting F which is the output of arithmetic part 13 to the external (CPU 8) of the distance-measuring sensor 1. Moreover, this output part 14 also has a function of detecting the maximum integral quantity at all image elements or image elements within the assigned regions and output it externally as analog data. This maximum integral quantity is used as a feedback signal in the integral control made by the CPU 8. In this embodiment, the CPU 8 monitors an increase of this maximum integral quantity and issues a command when integration end at an appropriate point of time. The output as this feedback signal is not limited to the maximum integral quantity, and it does not matter if the output is the minimum integral quantity or the average integral quantity, etc.

The timing control part 15 is a part for supplying various timing signals to the parts. The timing signals are explained. First, timing signals supplied to the integration control part 10 are trigger signals taken as timing signals of integration reset, integration start and integration end.

A timing signal supplied to the region-assigning part 11 is a clock signal for the switching of the integrating part (image elements of the light-receiving part 9). The same timing signal is also input into the signal converting part 12 and the arithmetic part 13 to execute signal conversion and calculation of the intermediate data F in synchronism with the integration output. A timing signal supplied to the output part 14 is a clock signal which becomes a synchronous signal in outputting the calculation result given by the arithmetic part 13 externally (CPU 8). This clock signal is used as a synchronous signal when the arithmetic result is output externally.

Figure 3:
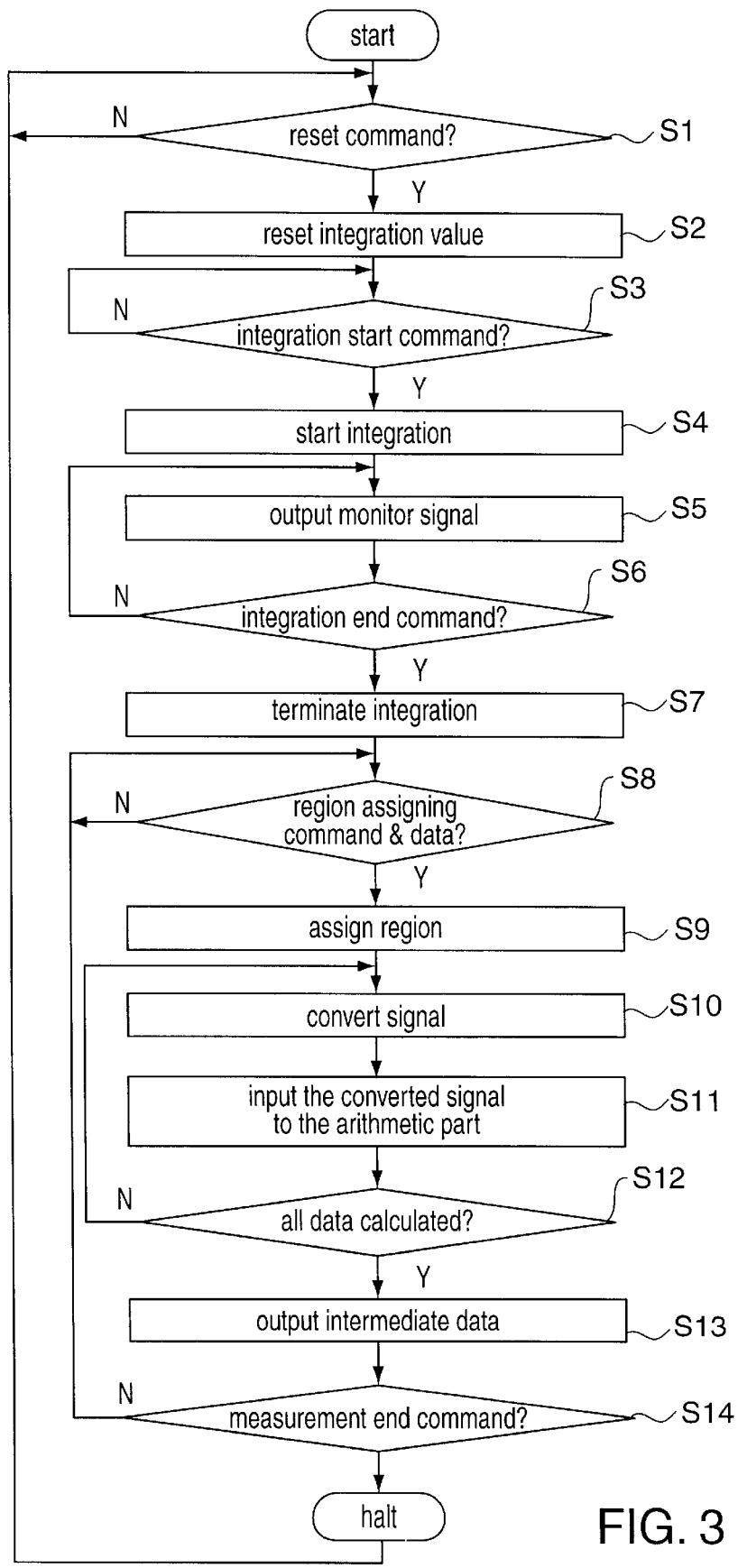
FIG. 3 is a drawing showing a flowchart for illustrating actions of a distance-measuring sensor relating to one embodiment of the present invention.

Next, actions of the entire distance-measuring sensor 1 in such a construction are illustrated by the flowchart of FIG. 3.

First, if a power source is input into the distance-measuring sensor 1 of this embodiment, the integration control part 10 judges whether a reset command of an integral quantity (a trigger signal taken as a timing signal of the integration reset) is input from the external (CPU 8) via the timing control part 15 (Step S1). If a reset command is input into the integration control part 10, the integration control part 10 resets the integral value of each image element of the light-receiving part 9 (Step S2). More specifically, it discharges a charge accumulated (charged) in a condenser for the integration. On the other hand, if a reset command is not input into the integration control part 10, the integration control part 10 waits until a reset command is input into it.

Next, the integration control part 10 judges whether an integration start command (a trigger signal taken as a timing signal of the integration start) is input from the external (CPU 8) via the timing control part 15 (Step S3). If an integration start command is not input into the integration control part 10, the integration control part 10 waits until an integration start command is input into it. On the other hand, if an integration start command is input into the integration control part 10, the integration control part 10 starts, the integration of each image element of the light-receiving part 9 (Step S4). Simultaneously, it starts the output of a monitor signal from the output part 14 externally (CPU 8) (Step S5). Here, the monitor signal is a feedback signal for the mentioned integration control. Generally, an integral quantity of the image element with the most advanced integration (the maximum value of integral quantity) is output externally as it is analog data with all the image elements of the light-receiving part 9 or image elements of the assigned regions of the light-receiving part 9 as targets. Of course, it does not matter if the average of integral quantities or an integral quantity of image element with the slowest integration is output. Moreover, this integral control is taken by the CPU 8 (or a sequence controller) outside the distance-measuring sensor 1 based on the monitor signal. The CPU 8 monitors changes of the integral value and outputs an integration end command at an appropriate point of time.

Subsequently, the integration control part 10 judges whether an integration end command (a trigger signal taken as a timing signal of the integration end) is input from the external CPU 8 via the timing control part 15 (Step S6). If an integration end command is input into the integration control part 10, the integration control part 10 ends the integration of the light-receiving part 9 (Step S7). On the other hand, if an integration end command is not input, the integration control part 10 continues the integration until an integration end command is input into it.

The following sequence is steps for calculation of F based on an object image signal and compensating the output of the result.

First, the region-assigning part 11 waits the inputs of a region-assigning command and data for assigning regions from the external region-assigning part 4 in the CPU 8 (Step S8). If these inputs exist, the region-assigning part 11 performs a region assignment based on data for the region assignment (Step S9). Moreover, line regions are assigned at four total locations as regions assigned in this embodiment.

Figure 4A:
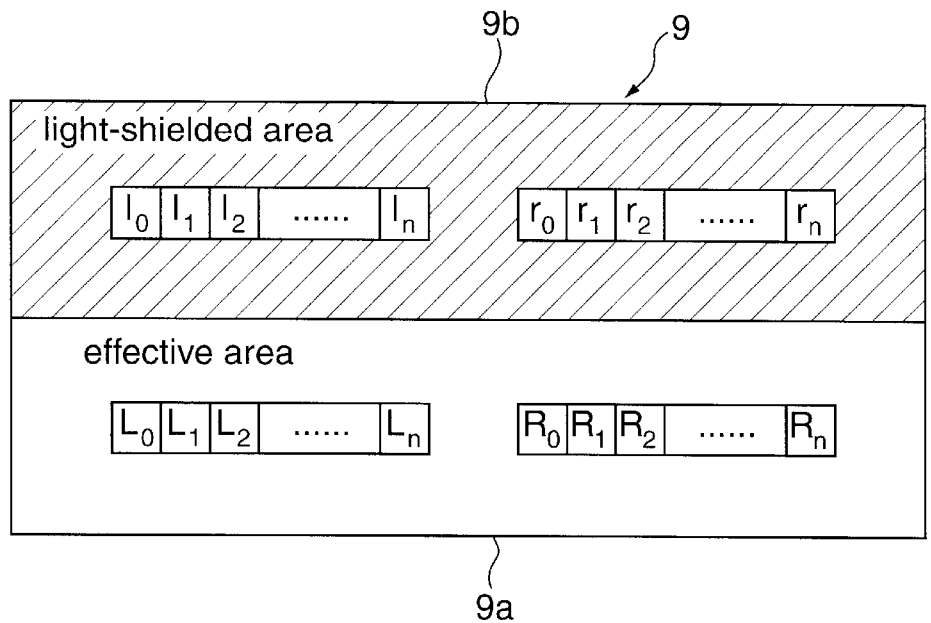
FIGS. 4A and 4B are diagrams for illustrating region assignments in the phase difference calculation of a distance-measuring sensor relating to one embodiment of the present invention.
Figure 4B:
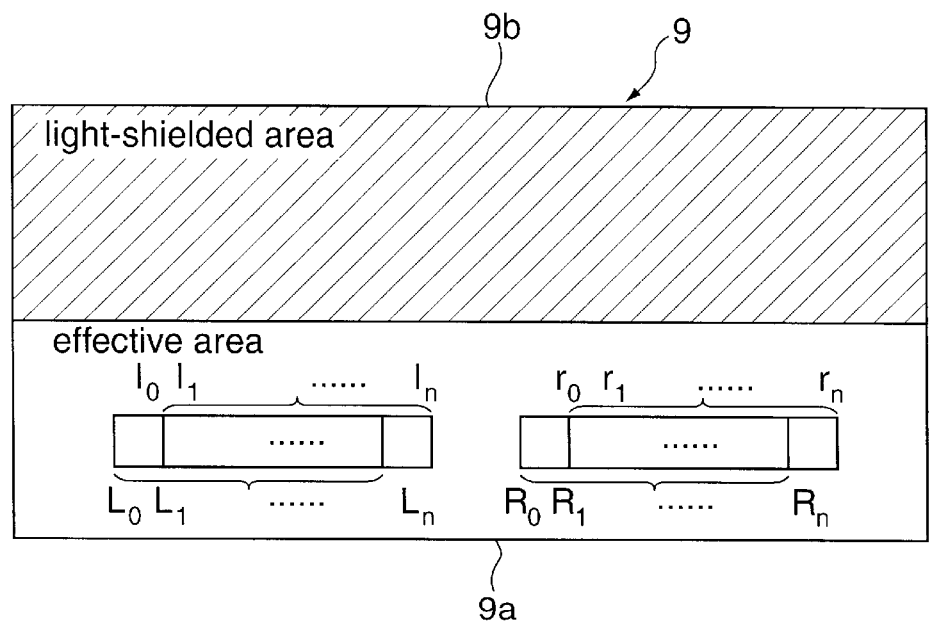

Here, the assignment methods of the regions of Step S9 are illustrated by FIG. 4A and FIG. 4B.

First, when an object has a common contrast, an assignment method of regions in the case of performing a phase difference calculation from an object image signal (first assignment mode) is illustrated. In this case, as shown in FIG. 4A, two regions ($L_0, L_1, \ldots, L_n$ and $R_0, R_1, \ldots, R_n$) in the effective area 9a of the light-receiving part 9 and two regions ($l_0, l_1, \ldots, l_n$ and $r_0, r_1, \ldots, r_n$) in the light shielded area 9b of the light-receiving part 9 are assigned. At this time, the regions $L_i$ (i=0, 1, ..., n) are assigned from the left side of the effective area 9a of light-receiving part 9 (a part irradiated by the left beam of the optical part 2), and the regions $R_i$ (i=0, 1, ..., n) are assigned from the right side of the effective area 9a of light-receiving part 9 (a part irradiated by the right beam of the optical part 2). The regions $l_i$ (i=0, 1, ..., n) are assigned from the left side of the light-shielded area 9b of light-receiving part 9 (a part irradiated by the left beam of the optical part 2), and the regions $r_i$ (i=0, 1, ..., n) are assigned from the right side of the light shielded area 9b of light-receiving part 9 (a part irradiated by the right beam of the optical part 2). Thus, if the four regions are assigned to execute the calculation of Eq. 1, the phase difference calculation is performed based on a vivid object image signal. Here, ($L_n-l_n$) and ($R_n-r_n$) have a meaning of canceling a noise component (dark current component) from the object image signal.

Next, when an object has a low contrast, an assignment method of regions in the case of performing a phase difference calculation from an object image signal (second assignment mode) is illustrated. In this case, a differential processing is given to the object signal to improve the measurement accuracy.

As shown in FIG. 4B, all 4 regions are assigned in the effective area 9a of the light-receiving part 9. At this time, the regions $L_0, L_1, \ldots, L_n$ and $l_0, l_1, \ldots, l_n$ are assigned so that 1 image element deviates from each other, and the regions $R_0, R_1, \ldots, R_n$ and $r_0, r_1, \ldots, r_n$ are similarly assigned so that 1 image element deviates from each other. At this time, the regions $L_i$ and $l_i$ (i=0, 1, ..., n) are assigned from the left side of the effective area 9a of light-receiving part 9 (a part irradiated by the left beam of the optical part 2), and the regions $R_i$ and $r_i$ (i=0, 1, ..., n) are assigned from the right side of the effective area 9a of light-receiving part 9 (a part irradiated by the right beam of the optical part 2). Thus, the calculation of Eq. 1 is executed and the differential processing (difference processing) is given to the object image signal by assigning the four regions. Of course, the noise component (dark current component) caused by taking the difference is also cancelled.

It is possible to simply switch the phase difference calculation without the differential processing on an object image signal and the phase difference calculation from a differentially processed object image signal by making the region assignment as described according to the contrast of an object. Accordingly, the distance measurement can be made for an object having a common contrast or a low contrast.

Moreover, for example, the switching of the region-assigning methods is performed by measuring the contrast of the object with a non-illustrated photometer, determining the measured contrast in the CPU 8 and switching to the region assignment for low contrast if the contrast is determined to be low. For example, this photometer takes in the output of the light-receiving elements for the image pickup of the camera and measures the contrast of the object by calculating the dispersion of the output.

After the region assignment of step S9 is ended, an integration result from each image element in the assigned regions is output and a signal conversion is made by the signal converting part 12 (Step S10). The signal converted integration result is input from the signal converting part 12 to the arithmetic part 13 (Step S11), and the arithmetic part 13 performs the calculation of Eq. 1. Here, the output order of integration results from the light-receiving part 9 is as follows.

$L_0, l_0, R_0, r_0, L_1, l_1, R_1, r_1, \ldots, L_n, l_n, R_n, r_n$.

Subsequently, the arithmetic part 13 judges whether all the data in the regions assigned in the step S9 are calculated (Step S12), if non-calculated data remain, the arithmetic part 13 returns to the step S10 to continue the calculation. On the other hand, a loop processing of steps S10 to S12 are omitted when all the data are calculated. Then, the arithmetical results based on the Eq. 1 (intermediate data F of the phase difference calculation) are output from the output part 14 externally (CPU 8) of the distance-measuring sensor 1 (step S13). The output intermediate data are input into the CPU 8 and held in the storage part 6. Then, the phase difference calculating part 7 in the CPU 8 continues the phase difference calculation based on the intermediate data of the phase difference calculation (correlated values) input into this CPU 8.

Moreover, F being the arithmetical results of Eq. 1 are the intermediate data of the phase difference calculation, and is generally called correlated values, etc. The well-known phase difference calculation obtains the correlated values while regions of one pair of the object image signals are deviated from each other and detects the minimum from the obtained multiple correlated values. The minimum of the correlated values indicates that the regions of one pair of object image signals is in the best agreement, and the deviation (distance) of region where this minimum of correlated values appears is taken as the phase difference of one pair of the object image signals. Accordingly, the calculation for obtaining the correlated values of step S11 is repeated while changing the position of the assigned regions in the step S8 (however, an assignment method is limited according to the contrast of the object as described) until the calculation for obtaining the minimum of the correlated values in the CPU 8 is ended to complete the phase difference calculation.

Namely, the CPU 8 judges whether the phase difference calculation is judged to end and, if the phase difference calculation is ended, inputs a distance measurement end command which instructs the end of the calculation for obtaining the correlated values and the action stop of the distance-measuring sensor 1 into the distance-measuring sensor 1. The distance-measuring sensor 1 judges whether the distance measurement end command is input externally CPU 8 (step S14) and repeats the calculation for obtaining the correlated values until the distance measurement end command is input (repeats the steps S8–S14 while changing the position of region assignment). If the distance measurement end command is input, the distance-measuring sensor 1 is made to a halt condition (a condition of suppressing the consumption current by stopping actions). It can be free from this halt condition and return to step S1 with hardware interruption, etc. The power source of the distance-measuring sensor 1 may also be cut off in this halt condition to eliminate the consumption current completely.

Thus, the distance-measuring sensor 1 outputs the intermediate data of the distance calculation rather than the object image signals in this embodiment. Therefore, it enables the saving of memory capacity of storage part 6 of the CPU 8 and the shortens the transmission time of the output data from the distance-measuring sensor 1 to the CPU 8. Moreover, this embodiment is also applicable for low-contrast object because it makes the region assignment and calculates the intermediate data according to the contrast of object by the methods as described. Thus, the distance-measuring sensor of the embodiment enjoys the universality or versatility.

Furthermore, in the embodiment, the noise component (dark current component) is cancelled by assigning four regions in the light-receiving part 9, but when the noise component is little, it is enough to assign at least two regions.

Still more, the regions are assigned according to the contrast of the object, but this embodiment can also be applied to the region assignment for switching distance-measuring points in a multipoint distance-measuring device where multiple points on a photographic picture are measurable as a modification example.

As described in detail, this embodiment does not impair the universality and provides a distance-measuring sensor 1 capable of constructing a distance-measuring system which relieves a large memory capacity of an external memory and an increase of data transmission time.

Namely, a saving of memory capacity of an external memory and a shortening of transmission time of output data can be accomplished by providing an arithmetic circuit in the distance-measuring sensor of the present invention which circuit, to do some extent, enables the calculation in the distance-measuring sensor itself (calculation for obtaining correlated values of the phase difference calculation), moreover, the distance of a low-contrast object can also be measured and the universality is not impaired by changing data used in the phase difference calculation according to an object image signal.

While it has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be construed to cover all modifications that may fall within the scope of the appended claims.

What is claimed is:

1. A distance-measuring sensor for use in a distance-measuring device, the distance measuring sensor comprising:
    a light-receiving part with multiple photoelectric conversion elements that convert a light from a distance measured object to an electric current according to an intensity of the light;
    an arithmetic part that calculates intermediate data of a distance calculation for obtaining a distance to the distance measured object by using data originated in an output of the light-receiving part; and
    an output part that outputs the calculated intermediate data of the arithmetic part externally.

2. The distance-measuring sensor of claim 1, wherein the arithmetic part calculates intermediate data through repeated calculations.

3. The distance-measuring sensor of claim 1, further comprising:
    a region-assigning part that assigns multiple regions on the light-receiving part based on an external control signal.

4. The distance-measuring sensor of claim 3, further comprising:
    an integrating part that integrates a photocurrent generated in each photoelectric conversion element of the light-receiving part, respectively and individually to make a current-voltage conversion; and
    a signal converting part in each photoelectric conversion element of each region assigned by the region-assigning part that converts an output of the integrating part to a digital signal and outputs it to the arithmetic part.

5. A distance-measuring sensor for use in a distance-measuring device, the distance-measuring sensor comprising:
    a light-receiving part with multiple photoelectric conversion elements that convert a light from a distance measured object to an electric current according to an intensity of the light, the light-receiving part being divided into an effective area where surfaces of the photoelectric conversion elements is not light shielded and a light shielded area where surfaces of the photoelectric conversion elements is light shielded;
    an integrating part that integrates a photocurrent generated in each photoelectric conversion element of the light-receiving part, respectively and individually to make a current-voltage conversion;
    a region-assigning part that assigns four line regions from the surfaces of the photoelectric elements based on an external control signal;

a signal converting part in each photoelectric conversion element of each region assigned by the region-assigning part that converts an output of the integrating part to a digital signal and outputs it to an arithmetic part;

an arithmetic part that calculates intermediate data of a distance calculation for obtaining a distance to the distance measured object by using an output of the signal-converting part; and an output part that outputs the calculated intermediate data of the arithmetic part externally.

6. The distance-measuring sensor of claim 5, wherein the region-assigning part has a first mode that assigns two regions from the effective area and two regions from the light shielded area, and a second mode that assigns two partly overlapped region pairs from the effective area.

7. The distance-measuring sensor of claim 5, wherein the arithmetic part takes the output signals of the signal converting part corresponding to the four regions as $L_0, L_1, \ldots, L_n$ and $l_0, l_1, \ldots, l_n$ and $R_0, R_1, \ldots, R_n$, and $r_0, r_1, \ldots, r_n$, where $L_i$ represents the elements of a first region, $l_i$ represents the elements of a second region, $R_i$ represents the elements of a third region, and $r_i$ represents the elements of a fourth region and makes a calculation of $$F = \sum_{i=0}^{n} |(L_i - l_i) - (R_i - r_i)|$$

where F is the output of the arithmetic part.

8. A distance-measuring method for calculating a distance to a distance measured object, comprising:

receiving a light from the distance measured object by a distance-measuring sensor with multiple photoelectric conversion elements;

integrating, respectively and individually, photocurrents produced by the photoelectric conversion elements in the distance-measuring sensor to generate an integration result;

converting the integration result to digital data in the distance-measuring sensor;

calculating intermediate data of the distance calculation by using digital data in the distance-measuring sensor;

outputting the intermediate data from the distance-measuring sensor to an external device; and determining the distance using intermediate data in the external device of distance-measuring sensor.

9. The distance-measuring method of claim 8, wherein the arithmetic part calculates intermediate data through repeated calculations.

10. The distance-measuring method of claim 8, wherein calculation of the intermediate data is executed multiple times while changing regions of a calculated object based on an external control signal.

11. A distance-measuring device, comprising:

an optical part;

a distance-measuring sensor that converts light from a distance measured object, received by a light-receiving part via the optical part, to an electric signal, integrates the electric signal, calculates intermediate data of a distance calculation based on electric signal, and outputs the data; and a CPU that calculates a distance to the distance measured object based on the intermediate data.

12. The distance-measuring device of claim 11, wherein the intermediate data calculated by the distance-measuring sensor are correlated values for performing a phase difference calculation.

13. The distance-measuring device of claim 11, wherein the intermediate data calculated by the distance-measuring sensor are repeatedly calculated in the distance calculation.

14. The distance-measuring device of claim 11, wherein the CPU outputs a control signal for arbitrarily assigning multiple regions on a light-receiving part of the distance-measuring sensor to the distance-measuring sensor.

15. The distance-measuring device of claim 14, wherein four regions are assigned on the light-receiving part of distance-measuring sensor.

16. The distance-measuring device of claim 15, wherein output signals corresponding to four regions are taken as $L_0, L_1, \ldots, L_n$ and $l_0, l_1, \ldots, l_n$ and $R_0, R_1, \ldots, R_n$, and $r_0, r_1, \ldots, r_n$, where $L_i$ represents the elements of a first region, $l_i$ represents the elements of a second region, $R_i$ represents the elements of a third region and $r_i$ represents the elements of a fourth region and the intermediate data calculated by the distance-measuring sensor are $$F = \sum_{i=0}^{n} |(L_i - l_i) - (R_i - r_i)|.$$

17. A camera having a distance-measuring device, comprising:

a focusing optical part that is a part of a photographic lens;

a lens driving part that drives the focusing optical part;

an optical part;

a distance-measuring sensor that converts light from an object lighted by a light-receiving part via the optical part to an electric signal, integrates the electric signal, calculates intermediate data of a distance calculation based on the integrated electric signal and outputs the data; and a CPU that calculates a distance to a distance measured object based on the intermediate data and controls the lens driving part to drive a lens based on the distance calculated.

18. The camera of claim 17, wherein the intermediate data calculated by the distance-measuring sensor are correlated values for performing a phase difference calculation.

19. The camera of claim 17, wherein the distance-measuring sensor calculates intermediate data through repeated calculations.

20. The camera of claim 17, wherein the CPU outputs a control signal for arbitrarily assigning multiple regions on the light-receiving part of distance-measuring sensor to the distance-measuring sensor.

21. The camera of claim 20, wherein four regions are assigned on the light-receiving part of distance-measuring sensor.

22. The camera of claim 21, wherein output signals corresponding to the four regions are taken as $L_0, L_1, \ldots, L_n$, and $l_0, l_1, \ldots, l_n$ and $R_0, R_1, \ldots, R_n$, and $r_0, r_1, \ldots, r_n$, where $L_i$ represents the elements of a first region, $l_i$ represents the elements of a second region, $R_i$ represents the elements of a third region and $r_i$ represents the elements of a fourth region and the intermediate data calculated by the distance-measuring sensor are $$F = \sum_{i=0}^{n} |(L_i - l_i) - (R_i - r_i)|.$$

* * * * *